United States Patent [19]
Anderson et al.

[11] Patent Number: 5,880,880
[45] Date of Patent: Mar. 9, 1999

[54] THREE-DIMENSIONAL SCANNING CONFOCAL LASER MICROSCOPE

[75] Inventors: R. Rox Anderson, Lexington; Robert H. Webb, Lincoln; Milind Rajadhyaksha, Charlestown, all of Mass.

[73] Assignee: The General Hospital Corp., Boston, Mass.

[21] Appl. No.: 683,607

[22] Filed: Jul. 15, 1996

Related U.S. Application Data

[63] Continuation-in-part of Ser. No. 372,479, Jan. 13, 1995, abandoned.

[51] Int. Cl.⁶ .................................................. G02B 21/06
[52] U.S. Cl. .......................................... 359/385; 359/368
[58] Field of Search ...................... 359/235–236, 359/368, 356, 385–390; 250/216, 227.2, 234–230; 351/205–206, 221; 348/79

[56] References Cited

U.S. PATENT DOCUMENTS

| | | | |
|---|---|---|---|
| Re. 34,214 | 4/1993 | Carlsson et al. | 348/79 |
| 3,731,098 | 5/1973 | Hunt | 250/340 |
| 3,837,731 | 9/1974 | Amos et al. | 359/656 |
| 4,025,171 | 5/1977 | Peck | 359/823 |
| 4,208,101 | 6/1980 | Trapp et al. | 359/656 |
| 4,213,678 | 7/1980 | Pomerantzeff et al. | 351/206 |
| 4,215,271 | 7/1980 | Mudge et al. | 250/216 |
| 4,299,439 | 11/1981 | Stromblad | 359/384 |
| 4,398,211 | 8/1983 | Young | 348/79 |
| 4,407,008 | 9/1983 | Schmidt et al. | 348/79 |
| 4,576,450 | 3/1986 | Westphal | 359/384 |
| 4,734,578 | 3/1988 | Horikawa | 250/234 |
| 4,764,005 | 8/1988 | Webb et al. | 351/205 |
| 4,765,730 | 8/1988 | Webb | 351/205 |
| 4,768,873 | 9/1988 | Webb | 351/205 |
| 4,768,874 | 9/1988 | Webb et al. | 351/206 |
| 4,796,974 | 1/1989 | Brakenhoff | 359/814 |

(List continued on next page.)

FOREIGN PATENT DOCUMENTS

| | | |
|---|---|---|
| WO 96/21938 | 7/1996 | European Pat. Off. . |
| 4015988-A | 11/1991 | Germany . |
| 9000622-A | 10/1991 | Netherlands . |

OTHER PUBLICATIONS

Anderson et al., "The Optics of Human Skin", The Journal of Investigative Dermatology, 77:13–19, 1981.

Bertrand et al., "In Vivo Spatio–Temporal Visualization of the Human Skin by Real–Time Confocal Microscopy", Scanning, 16:150–154, 1994.

Corcuff et al., "In vivo Vision of the Human Skin with the Tandem Scanning Microscope", Dermatology, 186:50–54, 1993.

Corcuff et al., Morphometry of human epidermis in vivo by real–time confocal microscopy, Arch Dermatol Res, 285:475–481, 1993.

Murphy et al., Colligium on "New Microscopes in Medicine and Biology", IEE, Digest No. 1994/149, pp. 1–2.

New et al., "In Vivo Imaging of Human Teeth and Skin Using Real–Time confocal Microscopy", Scanning, 13:369–372, 1991.

(List continued on next page.)

Primary Examiner—Thong Nguyen
Attorney, Agent, or Firm—M. Lukacher; K. Lukacher

[57] ABSTRACT

A confocal microscope for generating an image of a sample includes a first scanning element for scanning a light beam along a first axis, and a second scanning element for scanning the light beam at a predetermined amplitude along a second axis perpendicular to the first axis. A third scanning element scans the light beam at a predetermined amplitude along a third axis perpendicular to an imaging plane defined by the first and second axes. The second and third scanning element are synchronized to scan at the same frequency. The second and third predetermined amplitudes are percentages of their maximum amplitudes. A selector determines the second and third predetermined amplitudes such that the sum of the percentages is equal to one-hundred percent.

18 Claims, 7 Drawing Sheets

U.S. PATENT DOCUMENTS

| | | | |
|---|---|---|---|
| 4,800,269 | 1/1989 | Horikawa | 250/234 |
| 4,827,125 | 5/1989 | Goldstein | 250/234 |
| 4,834,516 | 5/1989 | Kajitani et al. | 359/363 |
| 4,843,242 | 6/1989 | Doyle | 250/483 |
| 4,861,982 | 8/1989 | Smid et al. | 250/235 |
| 4,893,008 | 1/1990 | Horikawa | 250/234 |
| 4,893,886 | 1/1990 | Ashkin et al. | 359/350 |
| 4,893,920 | 1/1990 | Webb | 351/221 |
| 4,953,188 | 8/1990 | Siegel et al. | 378/43 |
| 4,959,552 | 9/1990 | Saffert et al. | 250/559.26 |
| 5,011,243 | 4/1991 | Doyle et al. | 359/356 |
| 5,099,363 | 3/1992 | Lichtman | 359/235 |
| 5,109,276 | 4/1992 | Nudelman et al. | 348/47 |
| 5,120,953 | 6/1992 | Harris | 250/227.2 |
| 5,225,671 | 7/1993 | Fukuyama | 250/216 |
| 5,239,178 | 8/1993 | Derndinger et al. | 250/234 |
| 5,296,703 | 3/1994 | Tsien | 250/235 |
| 5,334,830 | 8/1994 | Fukuyama et al. | 250/216 |
| 5,394,268 | 2/1995 | Lanni et al. | 359/386 |
| 5,532,873 | 7/1996 | Dixon | 359/368 |
| 5,691,839 | 11/1997 | Kobayashi | 359/368 |
| 5,719,700 | 2/1998 | Corcuff et al. | 359/368 |

OTHER PUBLICATIONS

Rajadhyaksha et al., "In Vivo Imaging of Human Skin with a Video–Rate Confocal Scanning Laser Microscope" Gordon Research Conference, 1994.

Webb et al., "Scanning Laser Ophtalmoscope", IEEE Transactions on Biodemical Engineering vol. BME–28, No. 7, 1981.

Webb et al., "Flying spot TV ophthalmoscope", Appl. optics, 19:2991–2997, 1980.

Webb, "Optics for Laser rasters", Optics, 23:3680–3683, 1984.

Webb et al., "Confocal scanning laser ophthalmoscope", Appl. Optics, 26:1492–1499, 1987.

"Multi–Depth Linear Scan Confocal Imaging System", IBM Technical Disclosure Bulletin, vol. 39, No. 1, Jan. 1996, pp. 147–148.

Patent Abstracts of Japan, vol. 017, No. 566 (p–1629, 14 Oct. 1993 & JP 05 164969 A (Olympus Optical Co. Ltd), 29 Jun. 1993.

Patent Abstracts of Japan, vol. 096, No. 006, 28 Jun. 1996 & JP 08 043040 A (Olympus Optical Co. Ltd), 16 Feb. 1996.

Cannon J et al: Ultraviolet Lasers Expand Uses of Confocal Microscopes: Laser Focus World, vol. 29, No. 1–1 Jan. 1993, pp. 99–100, 102–104.

THREE-DIMENSIONAL SCANNING CONFOCAL LASER MICROSCOPE

This application is a continuation-in-part of application Ser. No. 08/372,479, filed Jan. 13, 1995., now abandoned.

Studies relating to this invention were funded, in part, by DOE grant # DE-FG02-91ER61229. The United States government has certain rights in the invention.

BACKGROUND

The invention relates to confocal microscopes.

Confocal microscopy involves focusing and scanning light at a sample plane in order to form a high-resolution, highly magnified image. Conventional confocal microscopes image samples by generating a series of thin "optical sections" which are high-resolution images of thin planes within the sample (see, e.g., U.S. Pat. Nos. 4,827,125; 4,198,571, the contents of which are incorporated herein by reference). Confocal microscopy usually is done in vitro.

There are conventional types of confocal scanning microscopes. The tandem scanning confocal microscope ("TSCM") employs a rotating pinhole disk illuminated by a light source such as a mercury lamp. During operation, the disk sweeps a focal spot through a sample, and is additionally used to spatially filter back-scattered light. This instrument has been used, for example, to image sections of skin. A similar device, the confocal laser scanning microscope ("CLSM"), uses a laser beam to image a sample, such as a biopsied tissue sample. In this instrument, the laser beam is focused to a nearly diffraction-limited spot within a single plane of the sample. The spot is then scanned across the plane, or alternatively, the sample is translated using a micrometer stage. In general, the CLSM has greater detection power, superior wavelength selectivity, and better illumination power than the TSCM.

SUMMARY

The invention features a confocal microscope including an image plane rotation assembly. The image plane rotation assembly includes three scanning elements for scanning a light beam along three orthogonal axes. Two of the scanning elements are synchronized to scan at a selected frequency. A selector is used to set the desired amplitudes of the scanned light beams of the two synchronized scanning elements; the desired amplitudes are a percentage of their maximum amplitudes and the sum of the percentages is equal to one-hundred percent.

Preferred embodiments include the selector being a controller with a frequency source for selectively varying the amplitudes of the two synchronized scanning elements. The two synchronized scanning elements are driven by a common frequency source.

The confocal microscope includes a pivoting articulated arm housing a scanning element at a pivot point of the arm, an imaging lens, and a focussing lens positioned between the second scanning element and the imaging lens. The focussing lens is configured to make an entrance aperture of the imaging lens an optical conjugate to the scanning element in the arm so that spatial displacements of the field are minimized at the aperture. An aiming device aims the light beam as the light beam exits the scanning element and is configured to position the scanning element such that the light beam remains substantially centered on the entrance aperture of the imaging lens.

A light source emitting light at a wavelength between about 1550 and 1800 nm produces the light beam.

According to another aspect of the invention, a coupler for coupling a microscope objective lens to living tissue includes a template defining a tissue contacting surface for adhesive mounting to the tissue. The contacting surface defines a tissue imaging aperture. A housing defines a chamber for receiving the objective lens and includes a first mount for rigidly coupling the objective lens to the housing and a second mount for rigidly coupling the template to the housing.

According to another aspect of the invention, a method for generating an image of a sample includes illuminating the sample with a confocal microscope including an objective lens for focusing a light beam at the sample, and locating an index matching fluid having an index between about 1.39 and 1.41 between the objective lens and the sample.

The inventions have many advantages. The operator can non-invasively view optical sections of living tissue which are oriented along horizontal, vertical, or variably-angled planes. Images can be taken from well below the surface of the tissue. The microscope's articulated arm allows convenient positioning and contact with tissue. The articulated arm is configured to require fewer optical surfaces than in conventional systems, thereby minimizing light attenuation. The imaging lens contained by the arm can be placed in direct contact with the tissue, thereby minimizing relative motion between the lens and the tissue, and stabilizing the depth of the plane to be imaged.

Other features and advantages of the invention will be evident from the following detailed description and from the claims.

DETAILED DESCRIPTION

Figures 1, 1A:
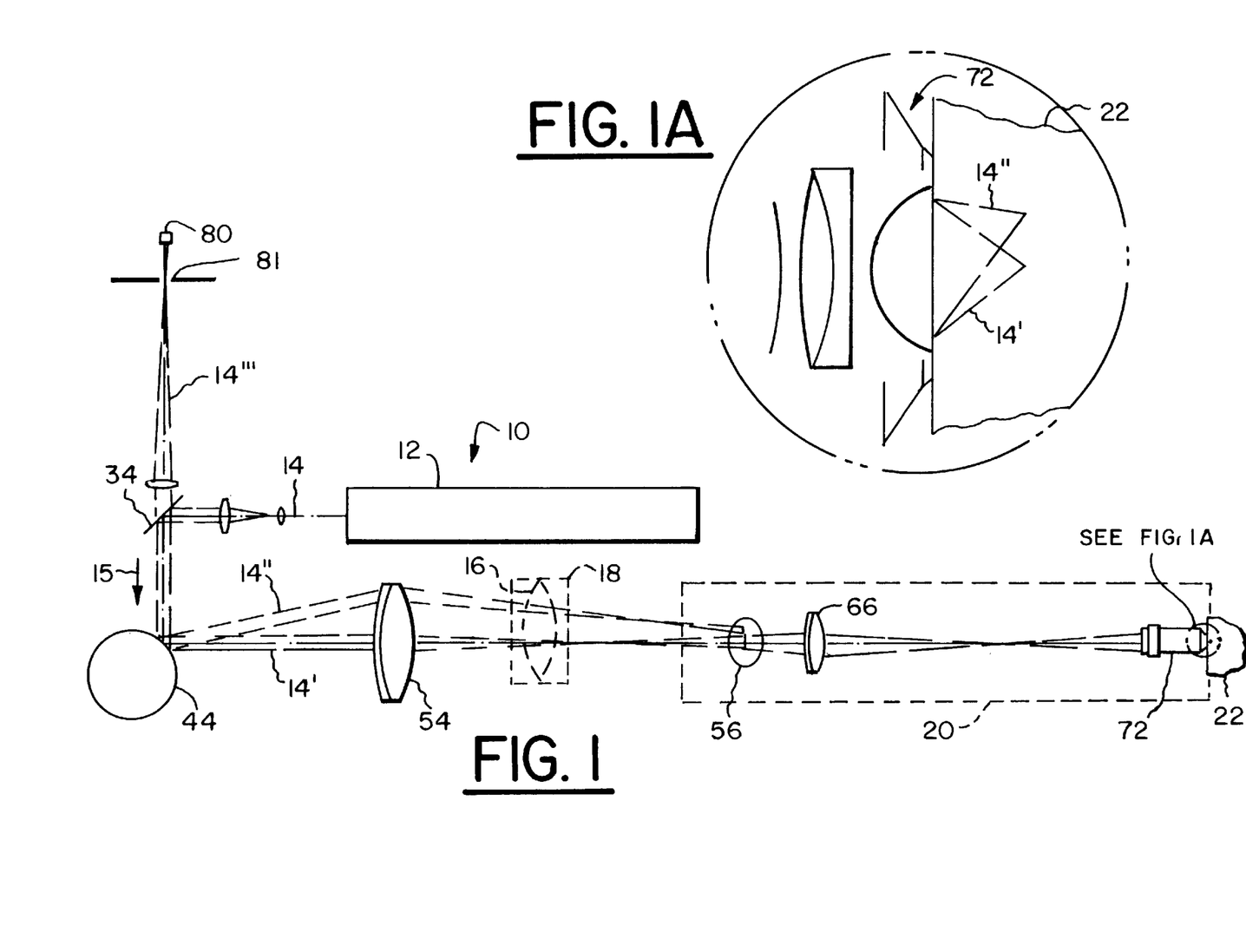
FIG. 1 is a diagrammatic representation of a confocal microscope according to the invention.
FIG. 1A is an enlarged view of a tissue engaging imaging lens of the confocal microscope of FIG. 1.

Referring to FIGS. 1 and 1A, a confocal microscope 10, according to the invention, includes a laser 12 producing an imaging field 14 along an optical path 15 (the z axis). Imaging field 14 is delivered to a sample, namely a tissue 22, e.g. human skin, to be imaged via an articulated arm 20.

Imaging field 14 from laser 12 is propagated through a partially transmitting beam-splitting optic 34 onto a reflecting surface of a fast scan device 44, e.g., a rotating polygon mirror defining about 25 reflecting facets driven at about 37,762 r.p.m. (this frequency corresponds to 15.7 kHz, the standard video rate).

As fast scanner 44 rotates, imaging field 14 is scanned in an oscillatory fashion along an axis (the x axis) perpendicular to optical path 15 (the z axis). Imaging field 14 is then directed through a transfer lens 54 into articulated arm 20. Two representative fields 14', 14" angularly displaced by fast scanner 44 are shown in the figures.

Articulated arm 20 houses a slow scanner 56, e.g., a galvanometric mirror oscillating at a frequency of 60 Hz. Oscillation of slow scanner 56 scans the imaging field along a third axis (the y axis) perpendicular to the x and z axes. The scanned imaging field then passes through a focusing lens 66 onto a microscope objective lens 72. The depth of focus can be adjusted with lens 72 or, alternatively, by a focusing lens 16 (having, for example, a focal length of between 100 cm and 2 m) mounted on a scanning platform 18 which is translated along the beam path in an oscillatory manner in order to scan the depth of focus along optical pathway 15 (the z axis). In FIG. 1A, the two representative fields 14', 14" are shown focused within tissue 22 at discrete cites of constant depth.

Imaging is preferably performed using light remitted (i.e., reflected or emitted light) from tissue 22. A small portion 14''' of the imaging field 14 is reflected off of the tissue following irradiation. Remitted light passes through a pinhole 81 to an optical detector 80. The portion of the reflected field scanned along the x axis generates electrical signals synchronized to the standard video frequency of 15.7 kHz, and the portion of the reflected field scanned along the y axis and/or the z axis generates electrical signals synchronized to a lower frequency of about 60 Hz, a rate corresponding to the frame-renewal frequency of conventional U.S. video equipment.

Figure 2:
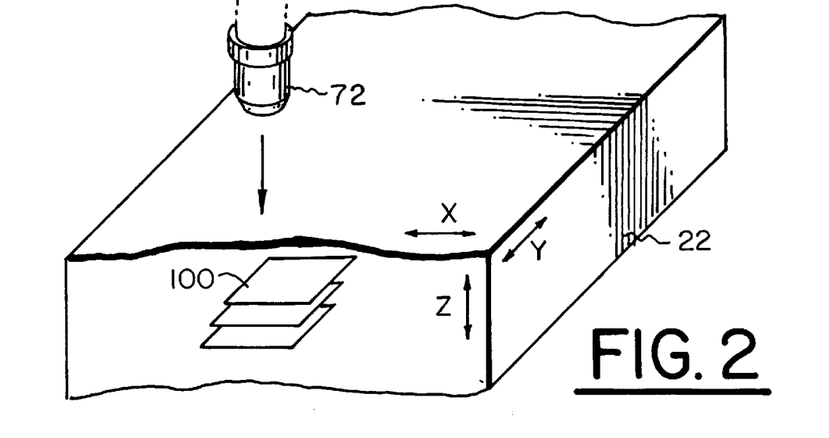
FIG. 2 is a side-sectional view illustrating xy sections taken at intervals along the z axis.
Figure 2A:
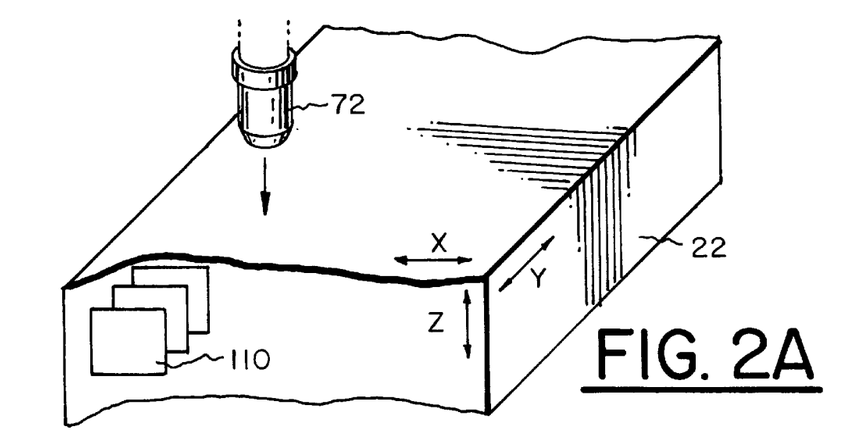
FIG. 2A is a side-sectional view illustrating xz sections taken at intervals along the y axis.
Figure 2B:
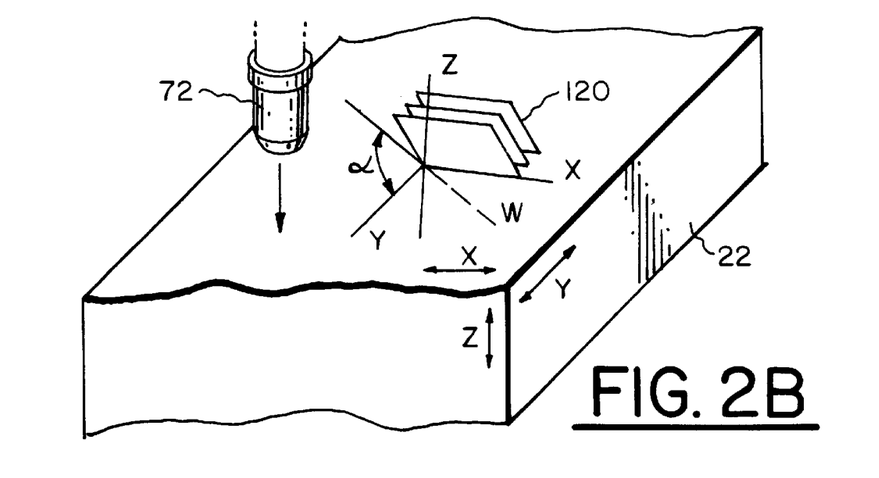
FIG. 2B is a side-sectional view illustrating xw sections taken at intervals perpendicular to the w axis where w is an axis at an angle to the y axis, in the yz plane.

Referring to FIGS. 2-2B, the scanning optics of the microscope can be manipulated to allow imaging of a series of horizontal (xy) sections 100 (FIG. 2), a series of vertical (xz) sections 110 (FIG. 2A), and a series of tilted (xw) sections 120 (FIG. 2B).

Different sections are imaged by changing the scanning magnitude (i.e., the magnitude of the scanning angle or longitudinal displacement) of one or more of the scanning optics 44, 56, 16. In the depth-dependent horizontal sections 100, the x and y axes are scanned, while the z axis is translated incrementally. For imaging of vertical sections 110, the x and z axes are scanned, while the y axis is translated incrementally.

Figure 3:
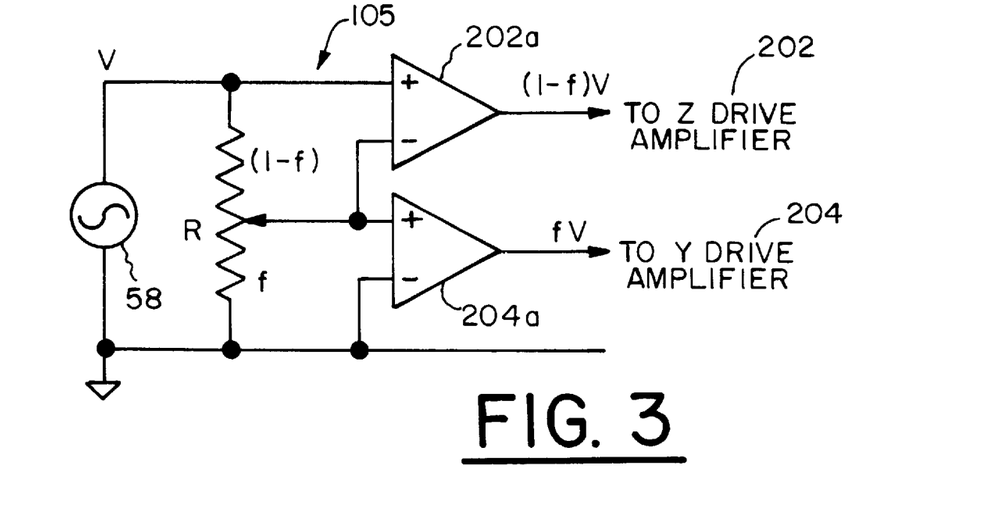
FIG. 3 is a schematic of a circuit for adjusting the relative scanning amplitudes along the y and z axes.

Tilted sections 120 are imaged by scanning all three axes, and adjusting the relative scanning amplitudes of the y and z axes. Referring to FIG. 3, the adjustments can be made using a balance control, such as a simple potentiometer circuit, which allows the relative amplitudes of the waveforms sent by a common waveform driver 58 to scanning platform 18 and slow scanner 56 to be varied. The scan frequencies of scanning platform 18 and slow scanner 56 are synchronized by driver 58 in a frequency range between about 1 and 100 Hz.

Figure 4:
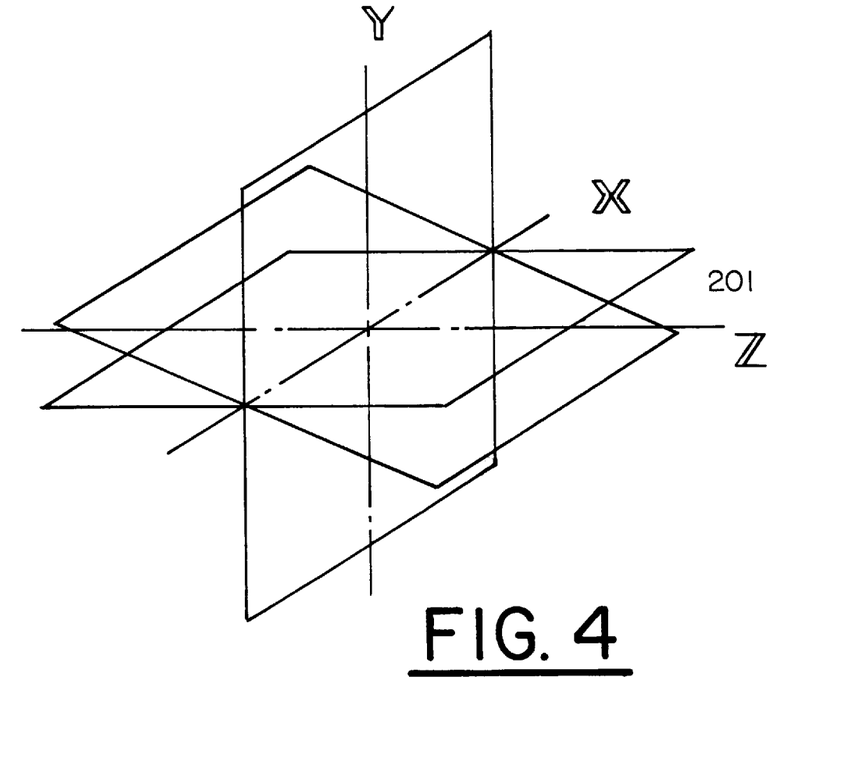
FIG. 4 is a scan of a tilted plane.

Circuit 105 allows scanning of the xy plane, the xz plane, or any plane that includes the x axis. The slow-scan drive voltage V is apportioned to drive amplifiers 202, 204 (z and y axes scanning) by a single potentiometer R through operational amplifiers 202a, 204a, respectively. For example, when the knob is all the way clockwise, then the fraction f is equal to zero, and the full voltage appears across drive amplifier 202, resulting in an xz scan (the voltage across drive amplifier 204 is then zero). When the knob is fully counter-clockwise, f is equal to one, and the full voltage appears across drive amplifier 204, resulting in an xy scan. In between, for example, setting f equal to 0.3, drive amplifier 204 is at 0.3 times (30% of) its maximum output and drive amplifier 202 is at 0.7 times (70% of) its maximum output, resulting in the scan of a plane 201 at 23 degrees to the z axis (tan 23=0.3/0.7) (see FIG. 4).

Figure 5:
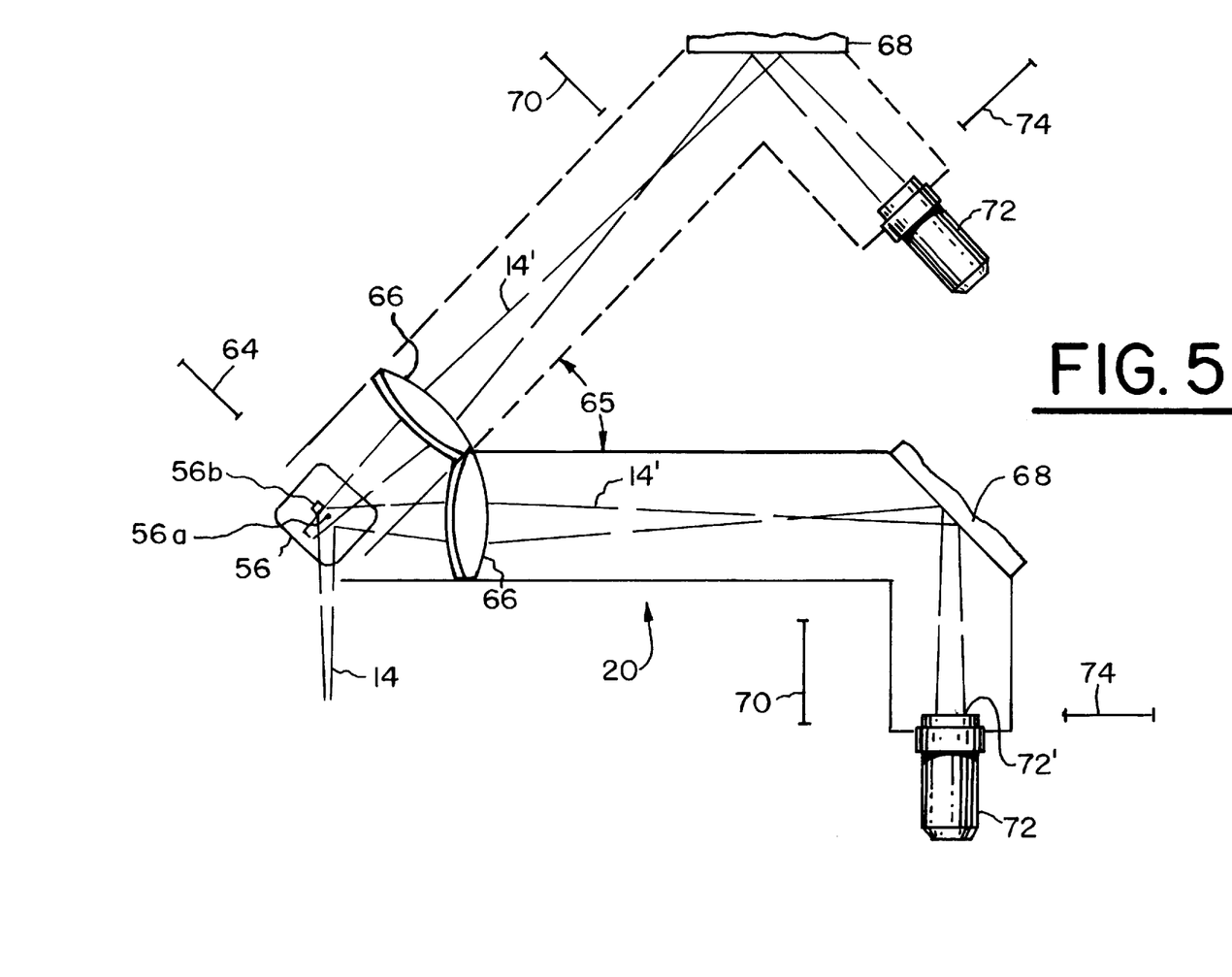
FIG. 5 is a diagrammatic representation of an articulated arm of the confocal microscope shown in two positions.

Referring to FIG. 5, slow scanner 56 is positioned at pivot point 56a of arm 20 located at the conjugate image plane corresponding to the object plane of the fast scanner 44. This positioning minimizes movement of imaging field 14 on the surface of a reflecting "elbow" joint 68. During operation, slow scanner 56 undergoes two types of angular motion: rapid, oscillatory angular motion (at the frequency, e.g., of 60 Hz) scans the imaging field along the y axis for imaging purposes; while slow, non-oscillatory motion centers the imaging field on entrance aperture 72' of objective lens 72 during movement of arm 20 (arrow 65). Slow scanner 56 is aimed on entrance aperture 72' by using a feedback sensor 56b, e.g., an encoder, which senses the movement of arm 20 and then slow scanner 56 is moved by half the angle of rotation of arm 20 about pivot point 56a. The slow motion can be accomplished with a mechanical gearing apparatus, although electrically induced motion, such as galvanometric motion, may also be used. The aperture of the objective lens 72 is positioned at the conjugate image plane corresponding to the object plane 64 of the mirror 56. The raster plane is shown at 70. The entrance aperture of the objective lens 72 is indicated by the lines 74.

Because the arm is mobile and can thus follow the movements of the subject, small time-dependent fluctuations in the tissue, such as those corresponding to the subject's breathing or heart beat, can be corrected when the arm is secured to the subject.

Figure 6:
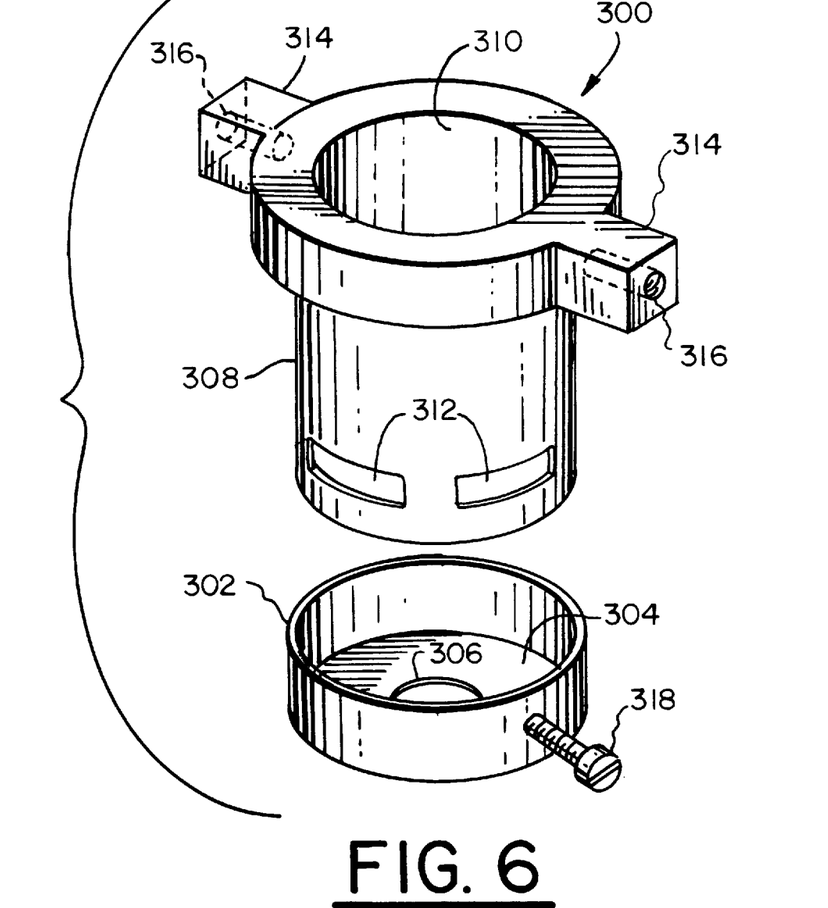
FIG. 6 is a diagrammatic representation of an imaging lens coupler, according to the invention.

Further stabilization of living skin can be achieved by more rigid microscope-to-skin coupling, e.g., by using an adhesive or suction to rigidly fix the skin to the articulated arm of the confocal microscope. Referring to FIG. 6, microscope-to-skin coupler 300 includes a brass ring 302 and template 304. Template 304 is glued onto the skin of the subject with a hole 306 in template 304 aligned with the skin site to be imaged. A microscope objective housing 308 defines a chamber 310 which receives objective 72. Housing 308 includes observation windows 312 and mounting arms 314 defining bolt receiving holes 316.

In use, template 304 is glued onto the subject's skin and housing 308 including objective 72 positioned within chamber 310 is placed within ring 302. Housing 308 and ring 302 are then attached using a screw 318.

Figure 7:
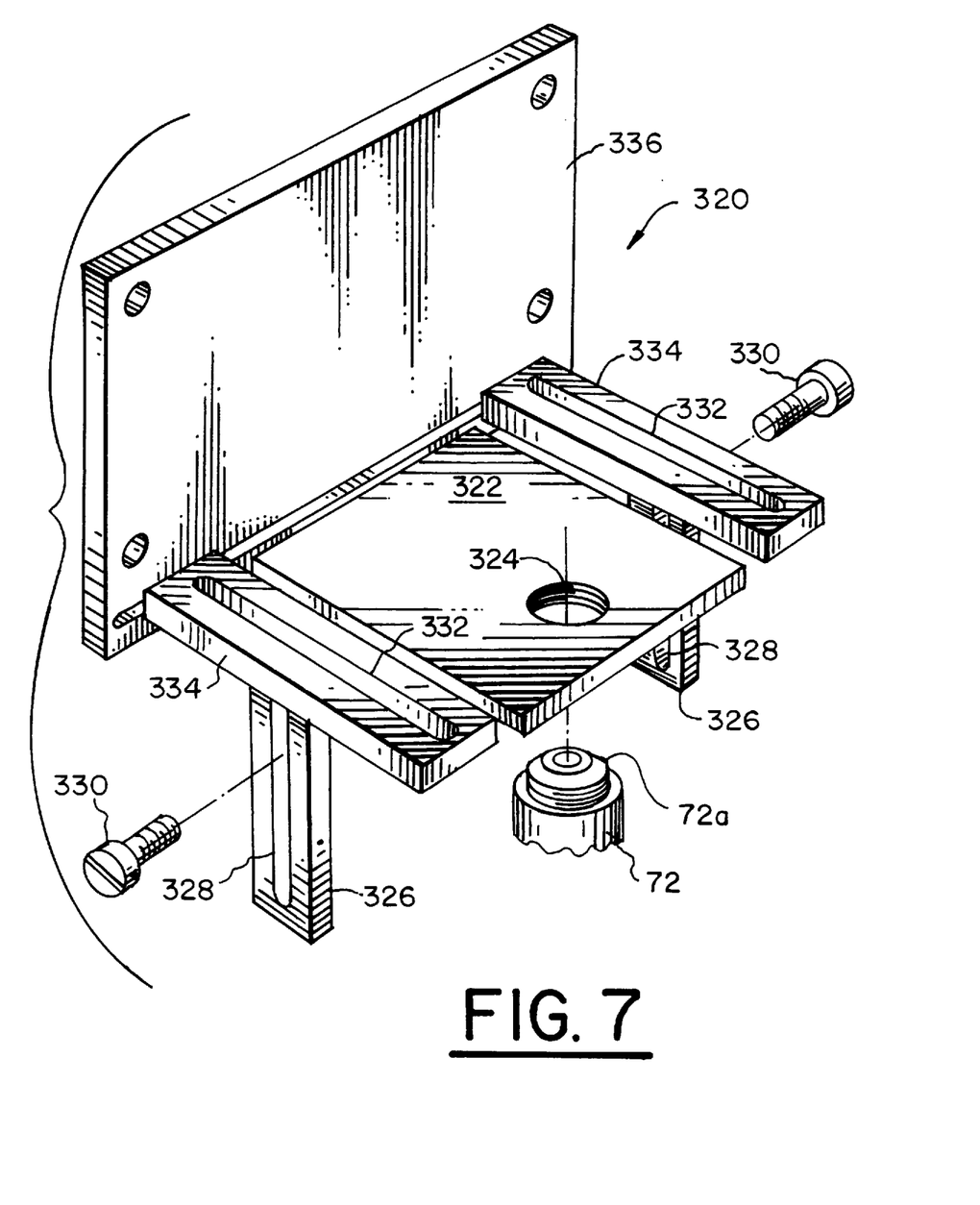
FIG. 7 is a diagrammatic representation of a mounting plate for use with the imaging lens coupler of FIG. 6.

Referring to FIG. 7, a mounting plate 320 includes a frame 322 defining a threaded hole 324 for engagement with a threaded portion 72a of objective 72. Arms 326 define slots 328 for attachment screws 330. Housing 308 is placed between arms 326 and screws 330 engage mounting holes 316 of arms 314. Slots 328 and slots 332 of arms 326, 334 permit respectively adjustment of the position of housing 308. Mounting plate 320 may be mounted to a three-dimensional stage (not shown) via face plate 336.

Figure 8:
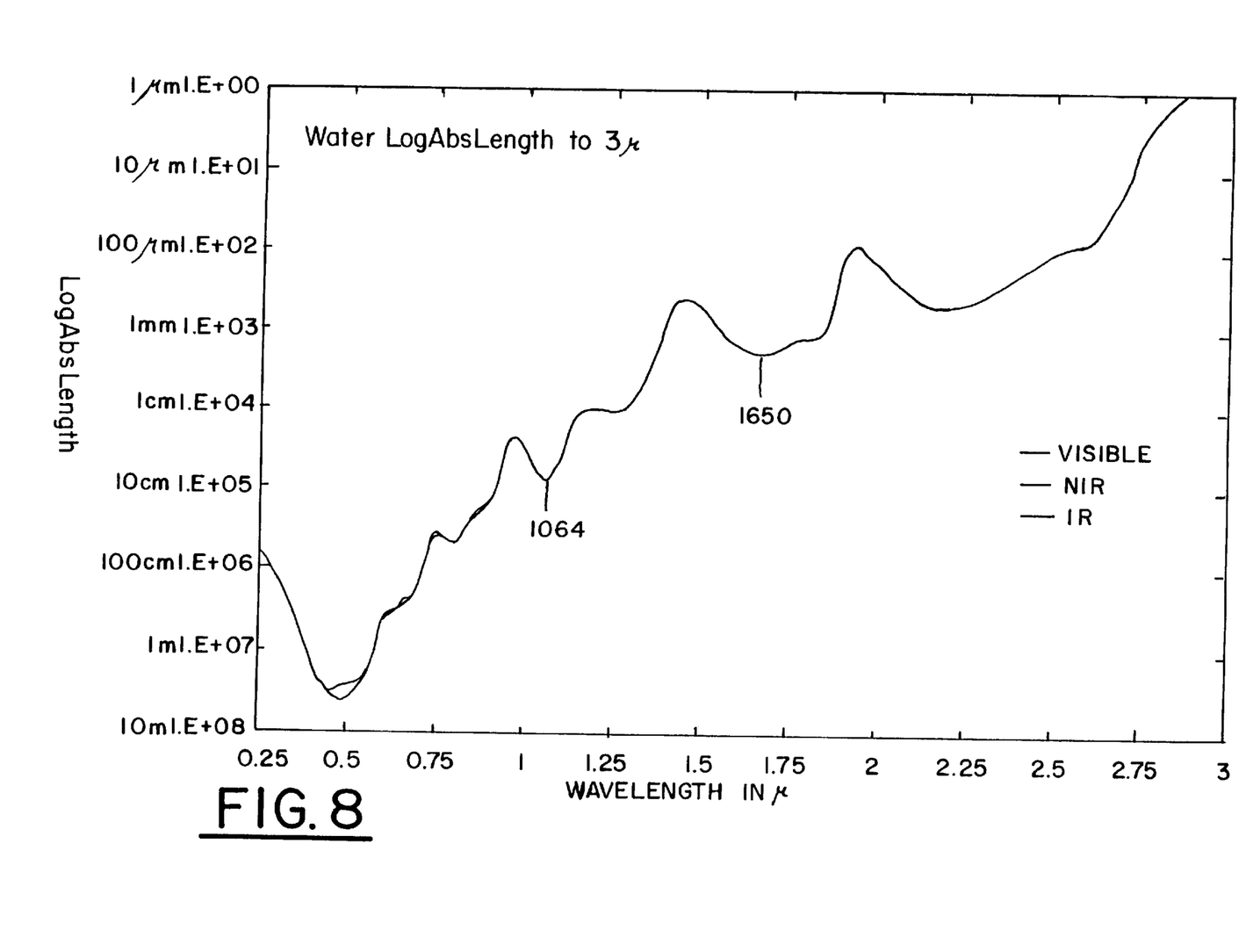
FIG. 8 is a plot of the absorption spectrum of water.

Referring to FIG. 8, the optical wavelength of laser 12 is chosen to optimize the image quality for a particular sample. Imaging of tissue 22 is dependent upon the refractive index difference between neighboring structures in the tissue and not absorption by stains or phosphorescent dies. This permits the wavelength of incident light to be selected for maximum penetration into the tissue. Wavelengths in the infrared are desirable because the light is less scattered, but water in the tissue is highly absorbent. Wavelengths in the infrared between the major water absorption bands, e.g., at 1064 nm and 1650 nm, are therefore preferred. In general, preferred wavelengths for imaging are between 700 and 2000 nm; shorter, visible wavelengths are strongly absorbed or optically scattered by most tissue, while selected bands and wavelengths deeper in the infrared (i.e., 1940 nm and wavelengths greater than about 3 microns) are more strongly absorbed by water present in most tissue.

Melanin, an epidermal absorber of light in the 600 nm to near-infrared region of the spectrum, strongly backscatters light and thus can be used with the confocal microscope of the invention as a naturally-occurring contrasting agent.

Refractive index matching of about 1.40 between objective lens 72 and tissue 22 enhances image quality. Forty percent sucrose in water as the matching fluid provides the desired index matching.

The confocal microscope may be used to generate, non-invasive, real-time, video-rate images of living tissue. Tissue can be imaged in vivo and at depths in the range of about 0 to 3 mm in the skin; no tissue biopsy or other invasive technique is required for obtaining a specimen for microscopy.

Other embodiments are within the scope of the following claims.

What is claimed is:

1. A confocal microscope including an image plane rotation assembly, said image plane rotation assembly comprising:
    a first scanning element for scanning a light beam at a first predetermined amplitude along a first axis,
    a second scanning element for scanning the light beam at a second predetermined amplitude along a second axis perpendicular to said first axis, said second predetermined amplitude being a percentage of a maximum second amplitude, thereby generating a two-dimensional imaging field in a plane defined by said first and second axes,
    a third scanning element for scanning the light beam at a third predetermined amplitude along a third axis perpendicular to said plane, said third predetermined amplitude being a percentage of a maximum third amplitude, said second scanning element scanning along the second axis at a selected frequency and said third scanning element being synchronized with said second scanning element to scan along the third axis at said selected frequency, and
    a selector for determining said second predetermined amplitude and said third predetermined amplitude, said second and third predetermined amplitudes being related such that a sum of the percentage of said maximum second amplitude and the percentage of said maximum third amplitude is equal to one-hundred percent.

2. The confocal microscope of claim 1 wherein said third axis comprises an optical pathway of the microscope, said third scanning element being mounted on an oscillating device configured to translate with an adjustable longitudinal displacement along the optical pathway.

3. The confocal microscope of claim 1 wherein said selector comprises a controller including a frequency source for selectively varying said second and third predetermined amplitudes.

4. The confocal microscope of claim 1 wherein said second scanning element and said third scanning element are driven by a common frequency source.

5. The confocal microscope of claim 1 wherein said second scanning element and said third scanning element are driven at a frequency of between about 1 and 100 Hz.

6. The confocal microscope of claim 1 further comprising a pivoting articulated arm housing the second scanning element.

7. The confocal microscope of claim 6 further comprising an imaging lens housed within said arm, said imaging lens being configured to receive the two-dimensional imaging field from said second scanning element and focus the two-dimensional imaging field to a focal plane in a sample.

8. The confocal microscope of claim 7 wherein said third axis comprises an optical pathway of the microscope, said articulated arm further comprising a focussing lens positioned along the optical pathway between the second scanning element and the imaging lens, said focussing lens configured to make an entrance aperture of said imaging lens an optical conjugate to said second scanning element so that spatial displacements of the field are minimized at said aperture.

9. The confocal microscope of claim 6 wherein said second scanning element is positioned at a pivot point of said articulated arm.

10. The confocal microscope of claim 9 further comprising an aiming device for aiming said light beam as said light beam exits said second scanning element.

11. The confocal microscope of claim 10 further comprising an imaging lens housed within said arm, said imaging lens being configured to receive the two-dimensional imaging field from said second scanning element and focus the two-dimensional imaging field to a focal plane in a sample, wherein said aiming device is configured to position said second scanning element such that said light beam remains substantially centered on an entrance aperture of said imaging lens.

12. The confocal microscope of claim 6 wherein said arm further comprises a reflective elbow joint configured to receive the two-dimensional imaging field from the second scanning element.

13. The confocal microscope of claim 1 further including a light source for producing said light beam, said light source emitting light at a wavelength between about 1550 and 1800 nm.

14. The confocal microscope of claim 1 wherein said microscope includes a microscope objective and further comprising a coupler for coupling the microscope objective to living tissue, comprising a template defining a tissue contacting surface for adhesive mounting to the tissue, said contacting surface defining a tissue imaging aperture, and a housing defining a chamber for receiving the objective lens.

15. The confocal microscope of claim 14 wherein an index matching fluid having an index between about 1.39 and 1.41 is disposed in said template's tissue imaging aperture, interfacing said objective lens and said tissue.

16. The confocal microscope of claim 14 further comprising a first mount rigidly coupling the objective lens to the housing, and said housing including a second mount for rigidly coupling said template to said housing.

17. A method for generating an image of a sample, comprising:
    a) illuminating said sample with a confocal microscope comprising
        a first scanning element for scanning a light beam at a first predetermined amplitude along a first axis,
        a second scanning element for scanning the light beam at a second predetermined amplitude along a second axis perpendicular to said first axis, said second predetermined amplitude being a percentage of a maximum second amplitude, thereby generating a two-dimensional imaging field in a plane defined by said first and second axes, a third scanning element for scanning the light beam at a third predetermined amplitude along a third axis perpendicular to said plane, said third predetermined amplitude being a percentage of a maximum third amplitude, said second scanning element scanning along the second axis at a selected frequency and said third scanning element being synchronized with said second scanning element to scan along the third axis at said selected frequency, and a selector for determining said second predetermined amplitude and said third predetermined amplitude, said second and third predetermined amplitudes being related such that a sum of the percentage of said maximum second amplitude and the percentage of said maximum third amplitude is equal to one-hundred percent, b) scanning said optical field through said sample, and c) receiving remitted light from said sample with a photodetector to form an image of the sample.

18. The method of claim 1 further including scanning said optical field through a sample including melanin as a naturally occurring contrasting agent.

* * * * *